(12) United States Patent
Prodic et al.

(10) Patent No.: US 11,722,055 B2
(45) Date of Patent: Aug. 8, 2023

(54) DC-DC CONVERTER WITH FLYING CAPACITOR PRE-CHARGING CAPABILITIES

(71) Applicant: Würth Elektronik eiSos GmbH & Co. KG, Waldenburg (DE)

(72) Inventors: Aleksandar Prodic, Toronto (CA); Michael Halamicek, Toronto (CA); Tom Moiannou, Markham (CA); Nenad Vukadinovic, Toronto (CA); Alexander Gerfer, Odenthal (DE); Mahmoud Shousha, Eching (DE); Martin Haug, Munich (DE)

(73) Assignee: Würth Elektronik eiSos GmbH & Co. KG, Waldenburg (DE)

( * ) Notice: Subject to any disclaimer, the term of this patent is extended or adjusted under 35 U.S.C. 154(b) by 61 days.

(21) Appl. No.: 17/042,511

(22) PCT Filed: May 3, 2019

(86) PCT No.: PCT/EP2019/061364
§ 371 (c)(1),
(2) Date: Sep. 28, 2020

(87) PCT Pub. No.: WO2019/211431
PCT Pub. Date: Nov. 7, 2019

(65) Prior Publication Data
US 2021/0057999 A1    Feb. 25, 2021

Related U.S. Application Data
(60) Provisional application No. 62/667,065, filed on May 4, 2018.

(51) Int. Cl.
*H02M 1/36* (2007.01)
*H02M 3/158* (2006.01)
(Continued)

(52) U.S. Cl.
CPC ............... *H02M 1/36* (2013.01); *H02M 3/06* (2013.01); *H02M 3/158* (2013.01);
(Continued)

(58) Field of Classification Search
CPC .... H02M 1/36; H02M 3/158; H02M 3/33569; H02M 3/06; H02M 3/01; H02M 3/07; H02M 3/33571
See application file for complete search history.

(56) References Cited

U.S. PATENT DOCUMENTS

| | | | |
|---|---|---|---|
| 5,808,879 A * | 9/1998 | Liu ..................... | H02M 3/01 363/56.05 |
| 6,349,044 B1 * | 2/2002 | Canales-Abarca ..... | H02M 1/34 363/56.08 |

(Continued)

FOREIGN PATENT DOCUMENTS

| | | |
|---|---|---|
| CN | 106253653 A | 12/2016 |
| EP | 3079252 A2 | 10/2016 |

(Continued)

OTHER PUBLICATIONS

Aarya et al, Multilevel Inverters—A Comparative Analysis (Year: 2017).*

(Continued)

*Primary Examiner* — Yusef A Ahmed
(74) *Attorney, Agent, or Firm* — McGlew and Tuttle, P.C.

(57) ABSTRACT

The voltage stress is limited across switches in multi-level flying capacitor step-down dc-dc converters during a start-up sequence by a circuit. In one embodiment, the circuit includes a diode that is adapted to prevent reverse current flow during steady state operation, a pull-down switch and a commutation cell, which includes a start-up capacitor and a flying capacitor.

4 Claims, 14 Drawing Sheets

(51) Int. Cl.
H02M 3/06 (2006.01)
H02M 3/335 (2006.01)
H02M 3/07 (2006.01)
H02M 3/00 (2006.01)

(52) U.S. Cl.
CPC .......... H02M 3/33571 (2021.05); H02M 3/01 (2021.05); H02M 3/07 (2013.01)

(56) References Cited

U.S. PATENT DOCUMENTS

| | | | | |
|---|---|---|---|---|
| 6,353,547 | B1* | 3/2002 | Jang | H02M 3/33571 363/16 |
| 6,459,219 | B1* | 10/2002 | Antheunes | H04N 3/233 315/366 |
| 7,612,603 | B1* | 11/2009 | Petricek | H02M 3/07 327/306 |
| 7,973,494 | B2* | 7/2011 | Yao | H02M 1/4225 363/52 |
| 8,547,073 | B2* | 10/2013 | Fujii | H02J 7/345 323/224 |
| 10,819,120 | B2* | 10/2020 | Shousha | H02M 3/1582 |
| 2002/0000923 | A1* | 1/2002 | Nishikawa | H02M 3/33571 341/22 |
| 2006/0050537 | A1* | 3/2006 | Zeng | H02M 3/33569 363/16 |
| 2007/0296383 | A1* | 12/2007 | Xu | H02M 7/4837 323/282 |
| 2010/0013548 | A1* | 1/2010 | Barrow | H02M 1/36 327/536 |
| 2010/0019807 | A1* | 1/2010 | Zhang | H03K 17/145 327/109 |
| 2011/0169474 | A1* | 7/2011 | Cuk | H02M 3/158 323/311 |
| 2012/0113688 | A1* | 5/2012 | Liang | H02M 3/285 363/21.12 |
| 2014/0169040 | A1* | 6/2014 | Schroeder | H02M 3/335 363/21.01 |
| 2015/0207401 | A1* | 7/2015 | Zhang | H02M 3/07 323/271 |
| 2015/0263612 | A1* | 9/2015 | Wu | H02M 3/07 323/312 |
| 2015/0288284 | A1* | 10/2015 | Lavieville | H02M 3/158 363/34 |
| 2015/0303818 | A1* | 10/2015 | Lin | H02M 3/01 363/21.03 |
| 2016/0006368 | A1* | 1/2016 | Kusuno | H02M 7/5395 363/131 |
| 2016/0315547 | A1* | 10/2016 | Li | H02M 1/4216 |
| 2016/0344214 | A1* | 11/2016 | Petersen | H02M 3/07 |
| 2016/0365799 | A1* | 12/2016 | Nakano | H02M 1/4225 |
| 2017/0149336 | A1* | 5/2017 | Kidera | H02M 3/158 |
| 2017/0155321 | A1* | 6/2017 | Kidera | H02M 7/483 |
| 2017/0338729 | A1 | 11/2017 | Chen et al. | |
| 2018/0006559 | A1* | 1/2018 | Chen | H02M 3/158 |
| 2018/0019669 | A1* | 1/2018 | Zhang | H02M 1/36 |
| 2018/0062537 | A1* | 3/2018 | Wang | H02M 7/483 |
| 2018/0205307 | A1* | 7/2018 | Vukadinovic | H02M 7/4837 |
| 2019/0058416 | A1* | 2/2019 | Wang | H02M 7/48 |
| 2020/0366211 | A1* | 11/2020 | Zhang | H02M 3/33573 |
| 2022/0014093 | A1* | 1/2022 | Ammar | H02M 3/07 |
| 2022/0021312 | A1* | 1/2022 | Hirokawa | H02M 1/0058 |
| 2022/0216804 | A1* | 7/2022 | Nishimura | H03F 3/4591 |
| 2022/0271667 | A1* | 8/2022 | Wang | H02M 3/1584 |

FOREIGN PATENT DOCUMENTS

| | | |
|---|---|---|
| JP | 3562714 B2 | 9/2004 |
| TW | 201812500 A | 4/2018 |
| WO | 2014182500 A1 | 11/2014 |

OTHER PUBLICATIONS

Aarya et al: "Multilevel Inverters—A Comparative Analysis", Feb. 4, 2017 (Feb. 4, 2017), pp. 43-50, Retrieved from the Internet: URL:http://www.iosrjournals.org/iosr-jeee/Papers/Conf.17017/Volume-3/7.%2043-50.pdf?id=7590 [retrieved on Jun. 24, 2019].

* cited by examiner

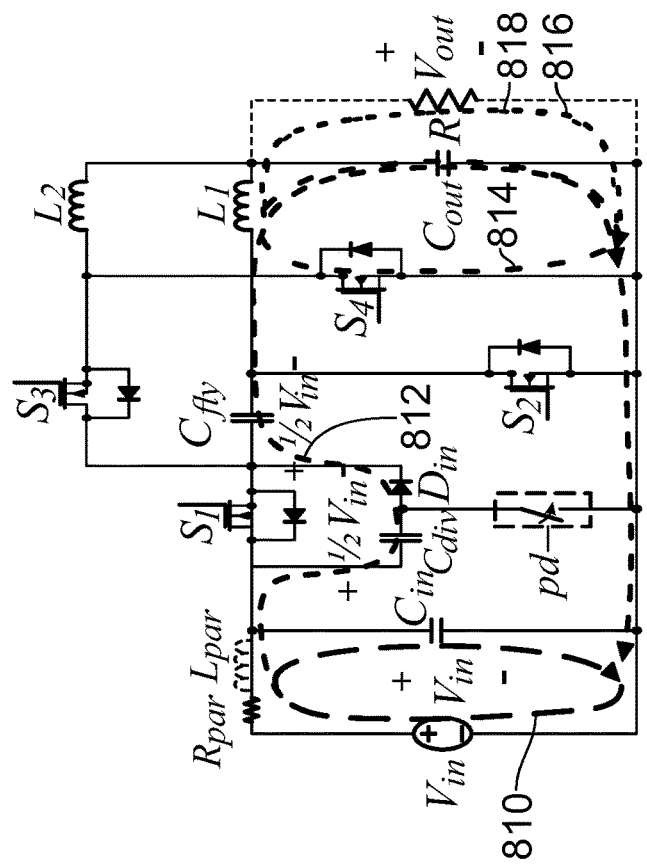
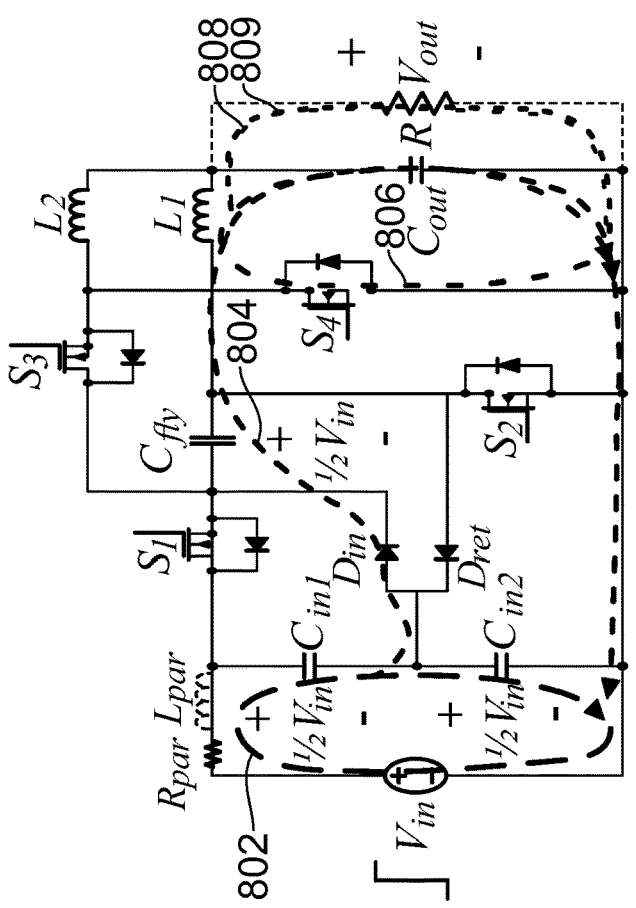
Fig. 8A
Fig. 8B

DC-DC CONVERTER WITH FLYING CAPACITOR PRE-CHARGING CAPABILITIES

CROSS-REFERENCES TO RELATED APPLICATIONS

The present patent application claims the priority of US provisional application U.S. 62/667,065, filed May 4, 2018, the content of which is incorporated herein by reference in its entirety as if fully set forth herein.

FIELD OF THE INVENTION

Embodiments of the present disclosure generally relate to the field of power engineering, and more specifically, embodiments relate to devices, systems and methods for improved power converter topologies.

BACKGROUND OF THE INVENTION

Multi-level flying capacitor (ML-FC) converters are potentially becoming a very attractive alternative to the widely-used conventional buck in low power DC-DC applications, processing power from a fraction of watt to several hundreds of watts, as they allow for a drastic reduction of the overall converter volume and improvement of power processing efficiency at the same time. Both are of considerable importance in numerous volume and weight sensitive electronic devices.

These advantages of ML-FC converters are obtained by reducing voltage swings across the inductors and switching components, allowing for smaller inductors to be used and lowering the voltage stress across switches during regular operation, resulting in reduced switching losses.

The ML-FCs are usually implemented through a replacement of the two buck converter switches with a switch-capacitor network consisting of a larger number of switches and flying capacitors effectively behaving as voltage dividers.

One of drawbacks of the ML-FC converters is the larger number of switches in the conduction path, often causing higher conduction losses. Theoretically, the lower voltage stress across the transistors during regular operation allows for the use of devices with lower blocking voltage having lower on-resistance, $R_{on}$, and elimination of the problem related to the higher conduction losses.

Theoretically, the lower voltage stress across the transistors during regular operation allows for the use of devices with lower blocking voltage and lower on-resistance, $R_{on}$, eliminating these higher conduction losses. Furthermore, lower voltage silicon is more cost-effective while having much better figure of merit (FOM), which represents the product of an $R_{on}$ resistance and a device capacitance for a fixed silicon area.

However, start-up presents a challenge to fully exploiting the lower switch stresses offered by these topologies. As demonstrated in FIG. 1, showing a 3-level converter as an example, the initial voltage of the flying capacitor, $C_{fly}$, before the power up is zero, and is not providing the voltage division function as in regular operation, when its ideal steady state voltage is $V_{in}/2$.

Therefore, during start-up, at least one of the transistors is exposed to the full input voltage preventing lower blocking voltage components with smaller $R_{on}$ to be used. Therefore, in practice, for the targeted applications, the ML-FCs usually still suffer from higher conduction losses compared to the conventional buck.

SUMMARY OF THE INVENTION

Embodiments described herein introduce two sets of methods for limiting the voltage stress across switches in multi-level flying capacitor step-down de-de converters during the start-up sequence. Corresponding systems, devices, apparatuses, controllers, control methods, and processors are contemplated for an improved power converter topology. In some cases, computer readable media stores instructions, which when executed, perform the steps of a control method for controlling a circuit or a converter. The embodiments are designed to aid in reducing the deficiencies noted in respect of ML-FCs, among others.

For a general N-level converter, some embodiments of the presented methods reduce the voltage stress to (N−1) times lower value than that of a conventional buck, allowing lower voltage rating transistors with smaller on-resistances to be used. These methods require no active control of switches on initial start-up (e.g., are free of active control), permitting use with systems where the gate driver and logic supply voltages are sourced from the converter input voltage or from an internal converter node.

These embodiments rely on the segmentation of the input filter capacitor or the utilization of flying capacitors as parts of voltage dividers. The first set of methods also reduces the stress during input voltage transients. The speed of these approaches is limited only by the quality of the matching between high-frequency impedances of the components.

Two sets of commutation-cell based methods are described for limiting the voltage stress across switches of ML-FC step-down DC-DC converters during power ups. For a general N-level converter, the presented methods reduce the voltage stress to (N−1) times lower value than that of a conventional buck, allowing lower voltage rating transistors with smaller on resistances to be used and, potentially, reducing the conduction losses to the same or even lower level than that of the buck converter.

Furthermore, some embodiments of the presented solutions potentially allow on-chip implantation of the entire power stage with lower voltage rated silicon components, that are usually more cost-effective while having much better figure of merit (FOM), which represents the product of an $R_{on}$ resistance and a device capacitance for a fixed silicon area. Two methods based on different types of commutation cells, are shown in various figures herein, having different design trade-offs.

In an embodiment, there is provided a power converter or a circuit forming a portion of a power converter comprising a commutation cell, the commutation cell including a first stacked capacitor and a second capacitor having a center node connected to terminals of a flying capacitor through a first diode and a second diode, the commutation cell receiving a voltage $V_{in}$.

In another embodiment, a voltage of the center node is set to approximately $V_{in}/2$.

In another embodiment, the power converter is a three stage converter.

In another embodiment, the power converter is a N-stage converter.

In another embodiment, the first diode and the second diode operate in concert to maintain the voltage of the center node at approximately $V_{in}/2$.

In another embodiment, there is provide a power converter or a circuit forming a portion of a power converter comprising a commutation cell, the commutation cell including start up capacitor, $C_{div}$, of comparable size to a flying capacitor that is connected between an input and a top of the flying capacitor, forming a capacitor divider.

In another embodiment, the power converter or the circuit further including a high current capacitor diode $D_{in}$ adapted to prevent reverse current flow during steady state operation.

In another embodiment, the power converter or the circuit further including a pull-down switch configured to pull a diode anode to ground after start-up, and maintain the diode in a reverse biased state of operation during a state of normal operation.

In another embodiment, the start up capacitor, the flying capacitor, and an output capacitor are in series during a power-up state.

In another embodiment, the power converter or the circuit of the power converter is a N-stage converter.

Corresponding control mechanisms, including printed circuit boards (PCBs), switching controllers, computer readable media storing instructions which when executed (e.g., by a microprocessor) control a converter or circuit in accordance with any of the methods described herein.

In some embodiments, the power converter or the circuit is housed within a power transformer or a switched mode power supply. The circuit, for example, may be used in various contexts, such as miniaturized DC-DC power applications, low power applications, among others, where space (e.g., for inductors) and cost is a constraining resource, and overall reduced volume and improved power processing efficiency is desirable. Applications include mobile devices, portable devices, high efficiency electronics, among others.

In the figures, embodiments are illustrated by way of example. It is to be expressly understood that the description and figures are only for the purpose of illustration and as an aid to understanding.

The figures are annotated with different dashed lines; the dashed lines are provided for reference to show aspects such as inrush current paths, etc. Different levels of dashing are utilized to illustrate different pathways, etc.

Embodiments will now be described, by way of example only, with reference to the attached figures.

BRIEF DESCRIPTION OF THE DRAWINGS

FIGS. 8A, 8B, 8C, 8D, 8E, and 8F are non-limiting example extensions of start-up methods to different flying capacitor buck topologies. FIGS. 8A, 8C, and 8E show the split input capacitor divider start-up method with the 2-phase series-capacitor buck, 4L-FC buck, and the 3-phase series-capacitor buck, respectively. FIGS. 8B, 8D, and 8F show the flying capacitor divider start-up method with the 2-phase series-capacitor buck, 4L-FC buck, and the 3-phase series-capacitor buck, respectively.

DESCRIPTION OF THE PREFERRED EMBODIMENTS

Two sets of methods are described in various embodiments for limiting the voltage stress across switches of multi-level flying capacitor (ML-FC) step-down DC-DC converters. For a general N-level converter, embodiments of the presented methods reduce the voltage stress to (N−1) times lower value than that of a conventional buck, allowing lower voltage rating transistors with smaller on-resistances to be used. These methods require no active control of switches on initial start-up, permitting use with systems where the gate driver and logic supply voltages are sourced from the converter input voltage or from an internal converter node. They rely on the segmentation of the input filter capacitor or the utilization of flying capacitors as parts of voltage dividers.

Figure 2:
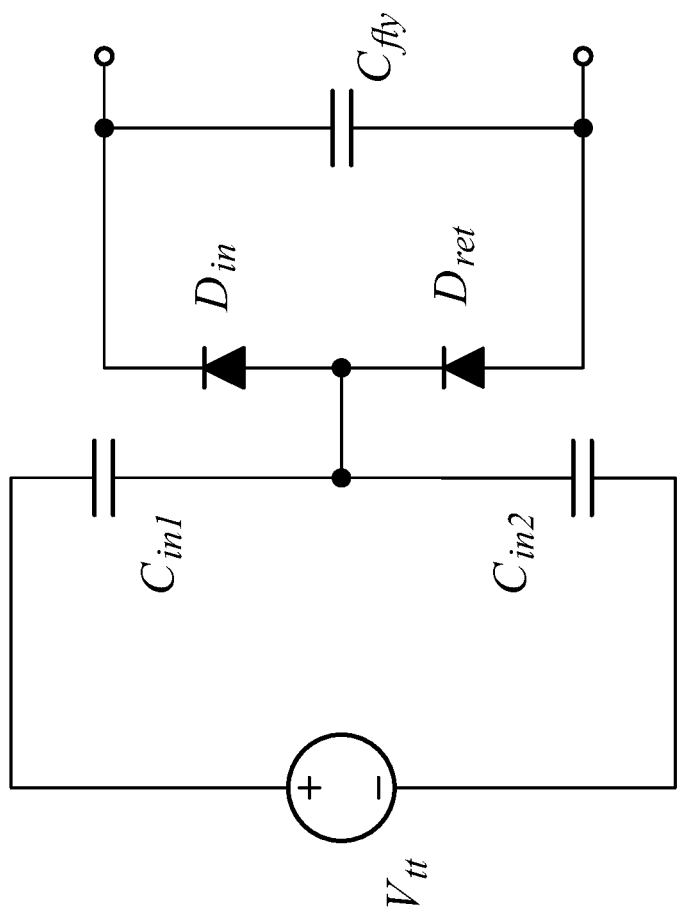
FIG. 2. is a circuit diagram of an example commutation cell for the input filter capacitive divider start-up method, according to some embodiments.
Figure 3:
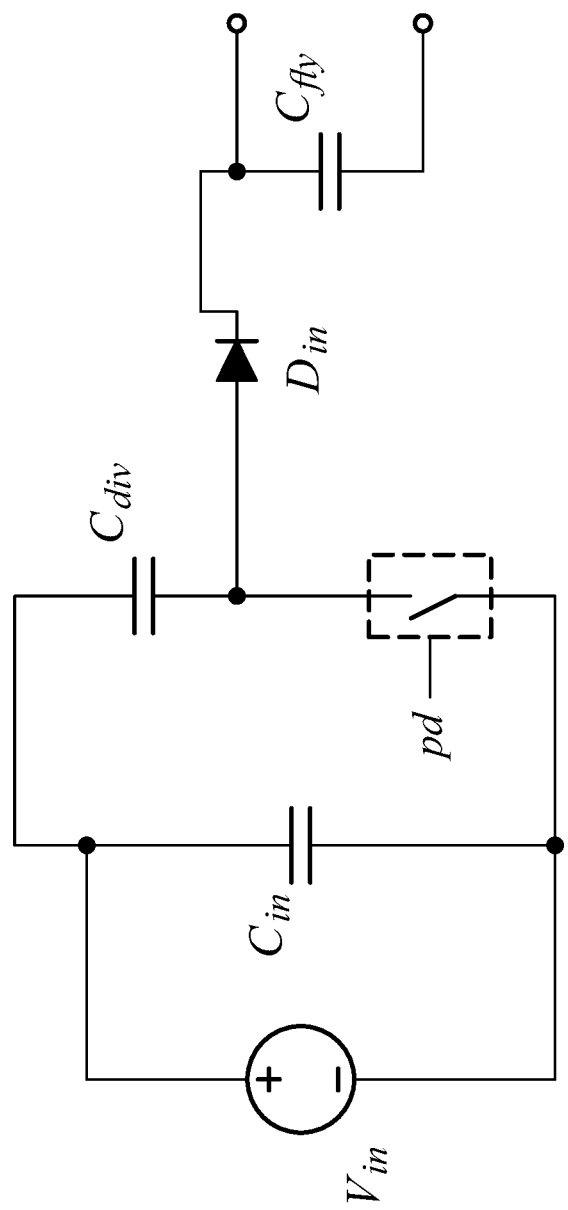
FIG. 3. is a circuit diagram of an example commutation cell for the flying capacitor divider start-up method, according to some embodiments.

The first set of methods also reduces the stress during input voltage transients. The commutation cells shown in FIG. 2 and FIG. 3 illustrate different methods. FIG. 2 is a commutation cell for an input capacitor divider start-up method, and FIG. 3 is a commutation cell for a flying capacitor divider start-up method.

The speed of these approaches is limited only by the quality of the matching between high-frequency impedances of the components. The methods have been verified on a 3-level 24V to 5V, 20 W experimental prototype, where an input voltage rise time of 5 us and reduction of voltage stress of 2 times are demonstrated.

Figure 1:
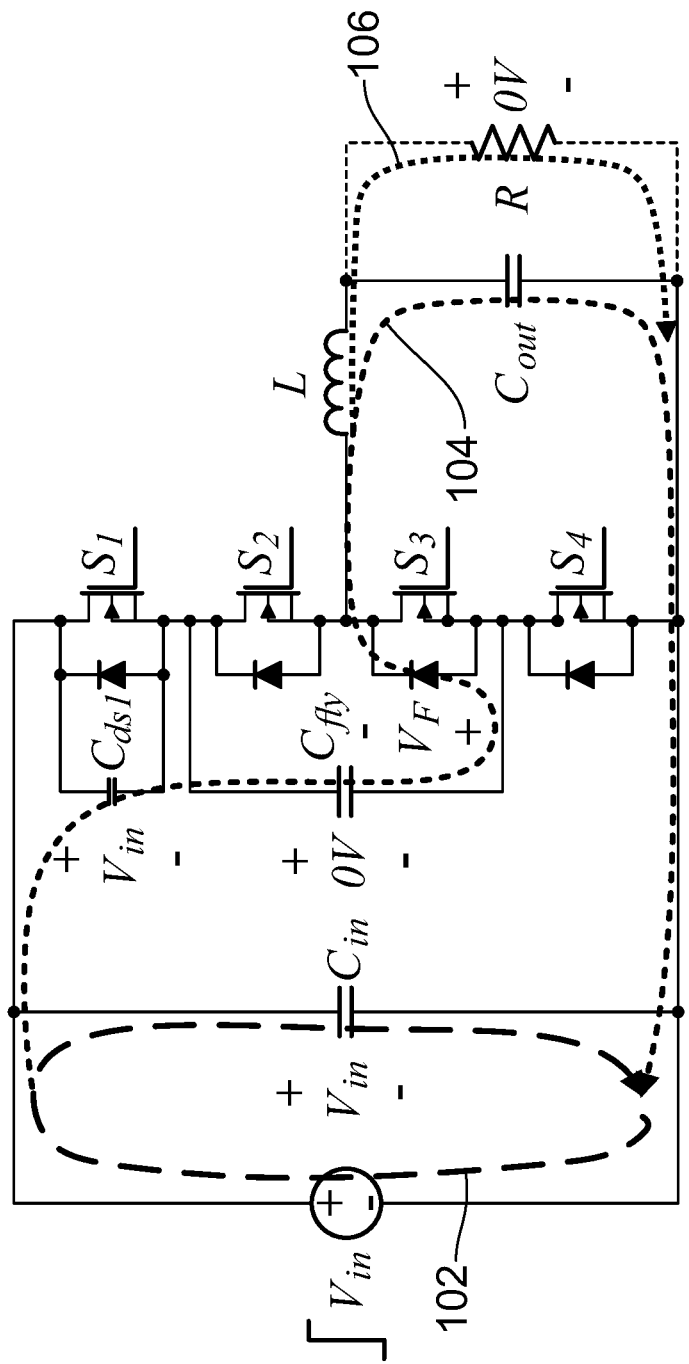
FIG. 1 is a circuit diagram of a three-level flying capacitor buck converter during start-up, according to some embodiments. The inrush current path is shown in dashed lines. Initial voltage distribution showing full input voltage across $S_1$.

FIG. 1 shows the in-rush current paths on start-up for a common flying capacitor topology, the three-level flying capacitor buck (3L-FC buck) converter. The current paths are shown in dashed lines at 102, 104, and 106.

In addition to the current charging the input filter capacitor, there is a small current that flows through the drain-source capacitance of $S_1$, $C_{ds1}$, through the flying capacitor, the body diode of $S_3$ and toward the relatively low impedance of the output filter. Upon initial ramp-up of the input voltage, $C_{ds1}$ forms a capacitive divider with the flying and output capacitors, which due to the much larger impedance of $C_{ds1}$ compared to $C_{fly}$ and $C_{out}$ results in nearly the entire input voltage being seen across $S_1$. Furthermore, once switching action begins, the flying capacitor takes many cycles to charge, during which time other switches may be exposed to the full input voltage. In the case of the 3L-FC buck, $S_4$ would also be exposed to the full input voltage upon initial switching.

Various solutions have been proposed to address these issues. Some assume that the input voltage ramps up slowly enough that the flying capacitor can be pre-charged and the converter soft-started, which would still permit the use of half-rated switches.

These solutions assume input voltage ramp times of 100s of microseconds to a few milliseconds and low input voltage slew rates. Others propose shorter input voltage ramp times and higher slew rates of 1V/μs, but expect that prior to start-up, logic and gate drive supplies are already on and stable. However, in the targeted low-power applications, these assumptions may not hold. Low power converters are usually exposed to much faster slew rates during input voltage ramp up due to the lower impedances of the reactive components at the converter input. To satisfy these criteria, some solutions propose adding a hot-swap circuit or some other series element in the conduction path at the converter input. One such approach involves adding two parallel fully rated switches at the converter input. One is a low impedance path that is enabled during normal operation, while the other path is a high impedance that serves to pre-charge the flying capacitor.

Similar hot-swapping structures can also be seen in power delivery architectures for server applications. While hot-swap events can be handled safely, the additional series switch serves no function as part of normal operation and generally degrades the power processing efficiency and/or increases silicon area, while also increasing complexity.

Instead of adding additional switches to the conduction pathway, one can also rate the main switch for the full input voltage. Pre-charging the flying capacitor can also be done in a more controlled manner through the action of two current sources placed in series with the flying capacitor. A feedback network forces the current sourced from the input voltage and the current discharged to ground to match.

These solutions eliminate the need for having both $S_1$ and $S_4$ rated for the full input voltage, but still require the use of one high voltage rating transistor in the conduction path and thus do not provide the full utilization of the lower voltage rating advantages of multi-level topologies. It is suggested that half rated switches can still be used if the current sources are scaled up sufficiently thereby increasing the charge rate of the flying capacitor.

However, generating these current sources and their supply voltages, particularly for higher input voltages, may be a significant challenge. These supplies would also have to be stable before the input voltage ramp and may burn non-negligible static power. Effectiveness is limited in the presence of relatively high start-up inrush currents caused by high input voltage slew rates.

The previous discussion indicates that the ideal solution would be a start-up approach that:
- requires no additional series elements to be placed in the conduction path,
- can respond to an infinitely fast input voltage ramp (i.e. hot-swap),
- is entirely passive and requires no additional supply voltages on start-up, and
- uses switches rated for steady state operation (e.g. $V_{in}/2$ plus some margin for the 3L-FC buck).

A converter that generally meets these criteria was recently proposed, which is functionally identical to the 2-phase series-capacitor buck. The strategy involves moving the main switch, which is strictly in series with voltage source, down to the ground path and then adding an additional capacitor between the base of the flying capacitor and the base of the voltage source. The flying capacitor and additional capacitor are now in series and connected across the voltage source. Unfortunately, the lack of a common ground may make this solution unviable in a number of applications. Additionally, this strategy of moving the main switch to the ground side of the source only works for the one switch that is strictly in series with the source. Consequently, this strategy cannot be extended to higher level flying capacitor converters (e.g., 4L-FC buck or 3-phase series-capacitor buck).

In the following subsections, start-up solutions that approach the ideal requirements and satisfy a majority of practical applications today are presented. Both of the approaches rely on the general principle of ML-FC converters, on the utilization of switching-capacitor network for obtaining voltage division.

A. Input Filter Capacitor/Commutation-Cell Based Solution

Figure 4:
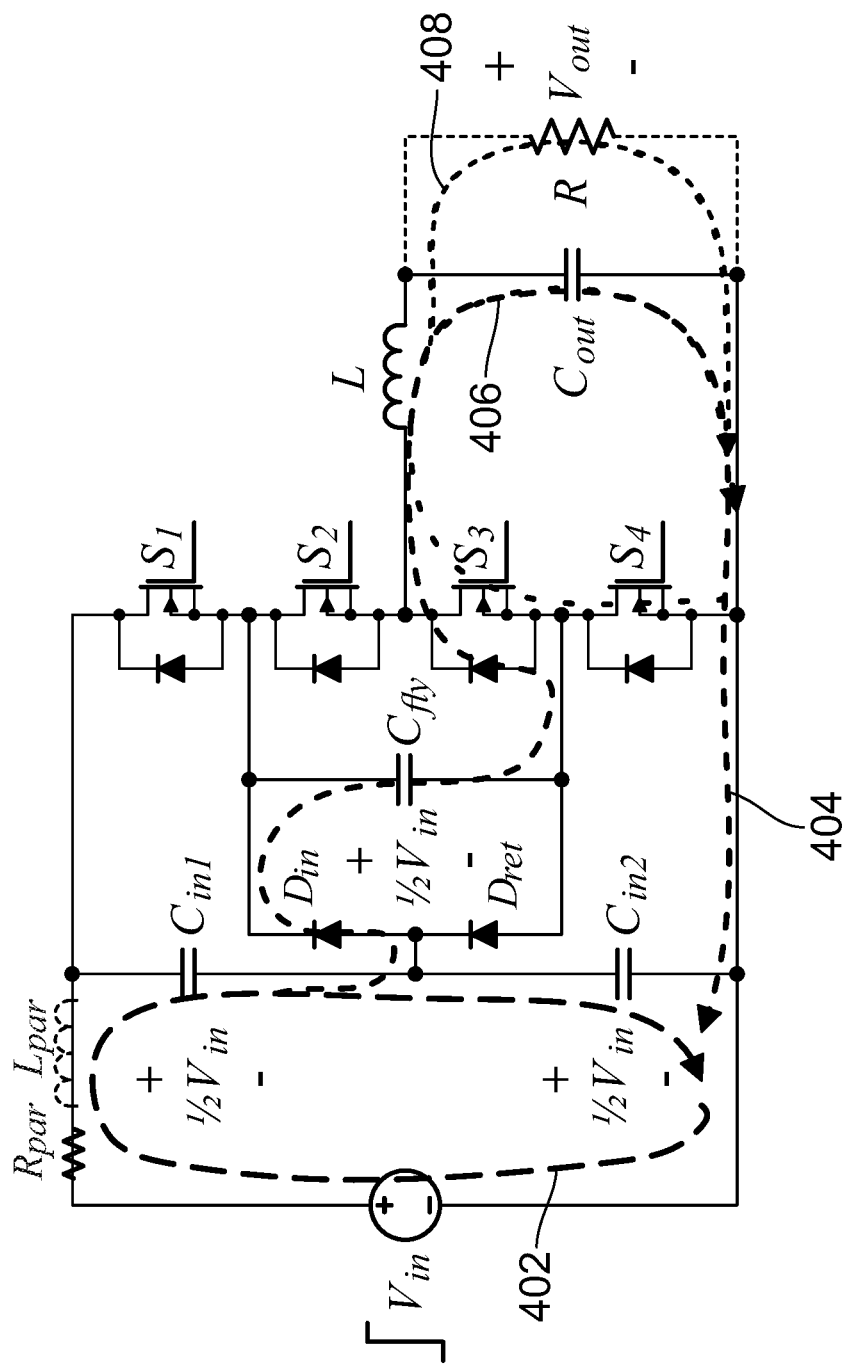
FIG. 4. is a circuit diagram of an example three-level flying capacitor buck converter with input filter capacitive divider start-up method, according to some embodiments. The inrush current path is shown in dashed lines along with initial voltage distribution.

This approach can be described through diagrams of FIG. 2, and FIG. 4. FIG. 2 shows the general commutation cell, where the voltage source $V_{in}$ is either the input voltage of the converter (for a 3-level converter, shown in FIG. 4) or the voltage between two neighboring taps of a capacitive divider for a general N-level case.

For a 3 layer (3L)-FC buck, the single input capacitor of FIG. 1 is replaced with two stacked capacitors, with the center node connected to the terminals of the flying capacitor through two diodes. The cathode of the high current capacity inrush diode, $D_{in}$, is connected to the top of the flying capacitor, while the anode of the small return diode, $D_{ret}$, is connected to the base of the flying capacitor. FIG. 4 shows this method as implemented in the 3L-FC buck converter with the initial inrush current path at 402 and 404 and the subsequent inductor discharge path at 406 and 408. On start-up, the inrush current flows through the input filter capacitors and splits the input voltage between them setting the center node voltage to approximately $V_{in}/2$. $D_{in}$ and $D_3$ become forward biased and charge the flying capacitor. Once the flying capacitor voltage reaches $V_{in}/2$ at its peak current, $D_{in}$ and $D_3$ will become reverse biased, and $D_4$ will begin to conduct until the inductor is fully discharged.

The final estimation of the flying capacitor and output capacitor voltages is complicated by the multiple impedance paths. However, if $C_{out} \gg C_{fly}$ and $C_{in1,2} \gg C_{fly}$ the output capacitor voltage is not greatly changed by the charging of the flying capacitor, which will charge to approximately $V_{in}/2$.

Determining the final value of the flying capacitor and output capacitor voltages can be complicated by the multiple impedance paths and by the presence of the inductor. Due to the high initial inrush current, once the flying capacitor reaches its steady state voltage, the high instantaneous inductor current causes charge to continue to be forced to the output through the low side switch, $S_4$. Damping along these paths is also very low as reduction in series resistance is key to reducing conduction losses. The resultant capacitor voltages depend on the values of the input, output and flying capacitors, the inductor, the characteristics of the diodes in the conducting pathway and the parasitic resistances and inductances in the paths. However, if $C_{out} \gg C_{fly}$ and $C_{in1,2} \gg C_{fly}$, the output capacitor voltage is not greatly affected by the charging of the flying capacitor, which will charge to $V_{in}/2$.

Figure 5:
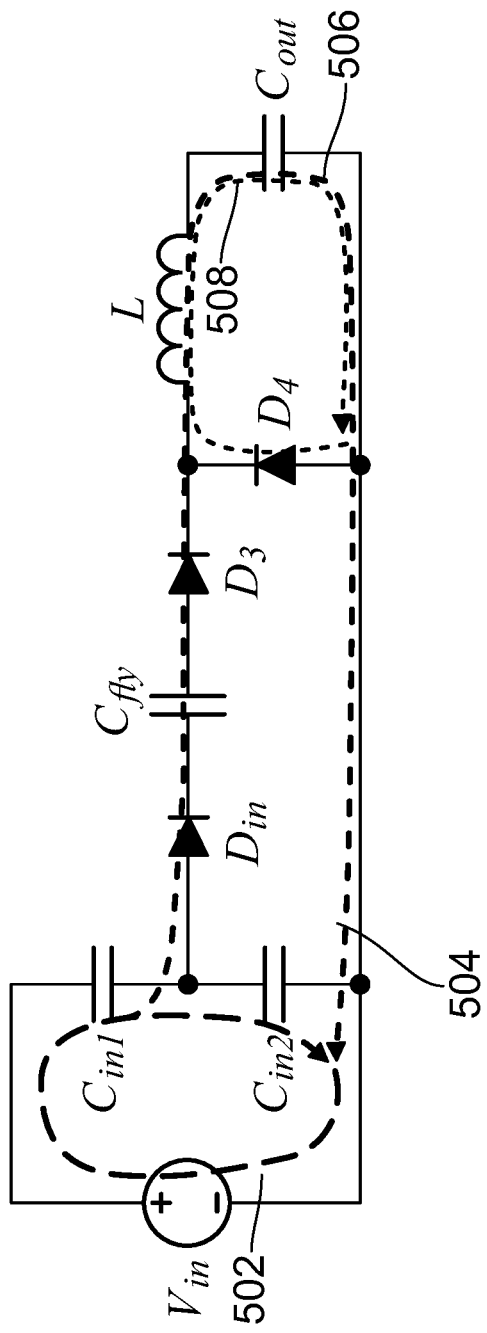
FIG. 5. is a circuit diagram of an example simplified ideal circuit model for the 3L-FC buck on start-up, according to some embodiments.

With a few simplifications, one can derive expressions for the final values of the flying capacitor voltage, the output voltage, and the current through the inductor and diodes on start-up. To obtain a worst-case approximation of these values, the approach assumes ideal diodes and negligible parasitics in the conduction pathway, giving the simplified circuit model for the 3L-FC buck on start-up shown in FIG. 5. Inrush current path shown at 502, 504, 506, inductor discharge path at 508.

Figure 6:
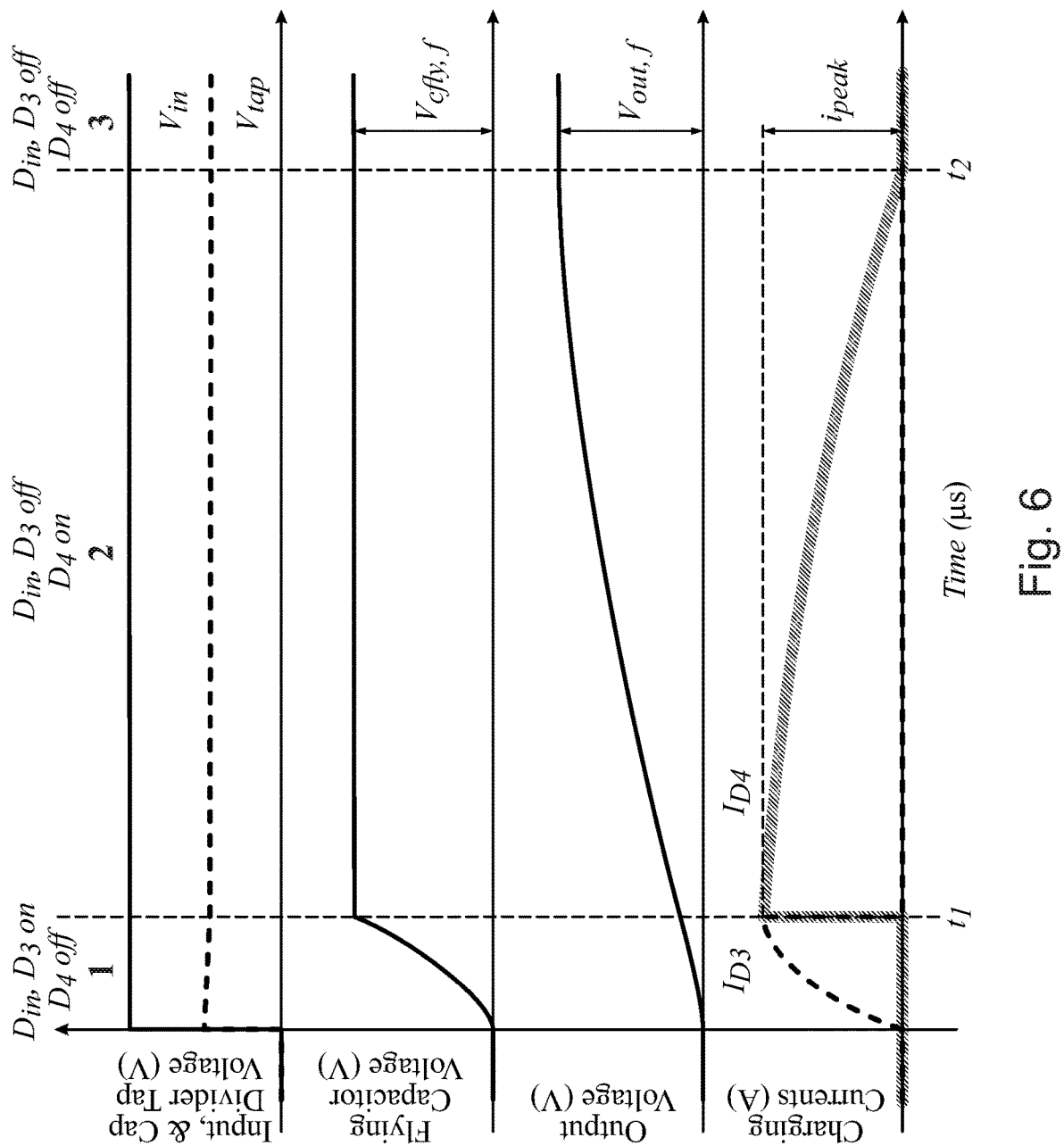
FIG. 6. is a waveform diagram of voltage and current waveforms corresponding to FIG. 5, according to some embodiments.

Corresponding waveforms of the flying capacitor voltage, the output voltage and the charging currents on start-up are shown in FIG. 6.

The equivalent capacitance of the flying and output capacitors is given by Eq. 1, where $C_{eq}$ is the equivalent capacitance, $C_{out}$ is the output capacitance, and $C_{fly}$ is the value of the flying capacitor. The resonant frequency of the output filter during portion 1 when $D_{in}$ and $D_3$ conduct is given by Eq. 2, and the resonant frequency of the output filter during portion 2 when $D_4$ conducts is given by Eq. 3, where $\omega_{o1}$ and $\omega_{o2}$ are the resonant frequencies during portions 1 and 2, respectively, and L is the value of the output inductor.

$$C_{eq} = \frac{C_{fly} C_{out}}{C_{fly} + C_{out}} \quad (1)$$

$$\omega_{o1} = \frac{1}{\sqrt{L C_{eq}}} \quad (2)$$

$$\omega_{o2} = \frac{1}{\sqrt{L C_{out}}} \quad (3)$$

For an input voltage step, the inductor will initially be seen as a high impedance and the centre tap voltage of the input capacitors, $V_{tap}$, will initially be set by the voltage divider of $C_{in1}$ and $C_{in2}$. This voltage will determine the maximum inductor charging current and consequently, the maximum output voltage. The final value of $V_{tap}$ will be determined by a capacitive voltage divider of the input capacitors and the equivalent output capacitance, $C_{eq}$, which will affect the point at which the inrush diode turns off and thus the final voltage of the flying capacitor.

On start-up, the peak charging current, $i_{peak}$, through the inductor, the inrush diode and the body diodes of $S_3$ and $S_4$ is given by Eq. 4, where $V_{in}$ is the input voltage, and $C_{in1}$ and $C_{in2}$ are the input capacitors. The maximum final output voltage, $V_{out,f}$ is given by Eq. 5. The final value of the flying capacitor voltage, $V_{Cfly,f}$ is given by Eq. 6.

$$i_{peak} = V_{in}\left(\frac{C_{in1}}{C_{in1} + C_{in2}}\right)\sqrt{\frac{C_{eq}}{L}} \quad (4)$$

$$v_{out_f} = V_{in}\left(\frac{C_{in1}}{C_{in1} + C_{in2}}\right)\sqrt{\frac{C_{eq}(C_{eq} + C_{out})}{C_{out}}} \quad (5)$$

$$v_{C_{fly_f}} = V_{in}\left(\frac{C_{in1}}{C_{in1} + C_{in2} + C_{eq}}\right) \quad (6)$$

The flying capacitor voltage settles at $t=t_1$. At $t=t_2$, the inductor finishes discharging fully, with the output voltage reaching its maximum. The expressions for these times are given in Eqs. 7 and 8, where $t_1$ and $t_2$ are the end times of portions 1 and 2 respectively.

$$t_1 = \frac{1}{\omega_{o1}} \frac{\pi}{2} \quad (7)$$

$$t_2 = \frac{1}{\omega_{o2}} \tan^{-1}\left(\sqrt{\frac{C_{out}}{C_{eq}}}\right) + t_1 \quad (8)$$

During regular converter operation, the flying capacitor voltage must be actively balanced at $V_{in}/2$ to limit the voltage stress across switches and maintain symmetrical current ripple, as well as overall stability of the system. Consequently, since the positive and negative terminals of the flying capacitor will range between $V_{in}/2$ and $V_{in}$, and 0V and $V_{in}/2$ respectively, the inrush and return diodes, $D_{in}$ and $D_{ret}$, keep $V_{tap}$ fixed at approximately $V_{in}/2$. This allows the use of input capacitors rated for half the input voltage. Capacitor volume generally scales with the energy storage requirements of the capacitor. Though the single input capacitor is replaced by two capacitors each with double the capacitance of the original, the rated voltage is halved and thus the total stored energy is the same. As a result, theoretically, the total volume of the stacked input capacitors, $C_{in1}$ and $C_{in2}$ should be comparable to that of the single input capacitor.

There is a potential limitation to the use of this input capacitor divider method. If the flying capacitor voltage is naturally lower than $V_{in}/2$, as is the case of the series-capacitor buck operating in $D^2$ mode for conversion ratios above 0.25, there will be current cycling through the diodes as the flying capacitor moves between the ground and input voltage rails during steady state. This cycling will reduce the efficiency of the system and disrupt its operation. In this case, the return diode can be omitted, only permitting unidirectional current flow.

However, the stacked input capacitors will have to be rated for the full input voltage, increasing volume and negating some of the benefits of this solution. For converters operating with similar modulation schemes, the second start-up method may be more desirable as the start-up capacitor does not affect the steady state operation of the converter.

B. Flying Capacitor Divider Based Solution

Figure 7:
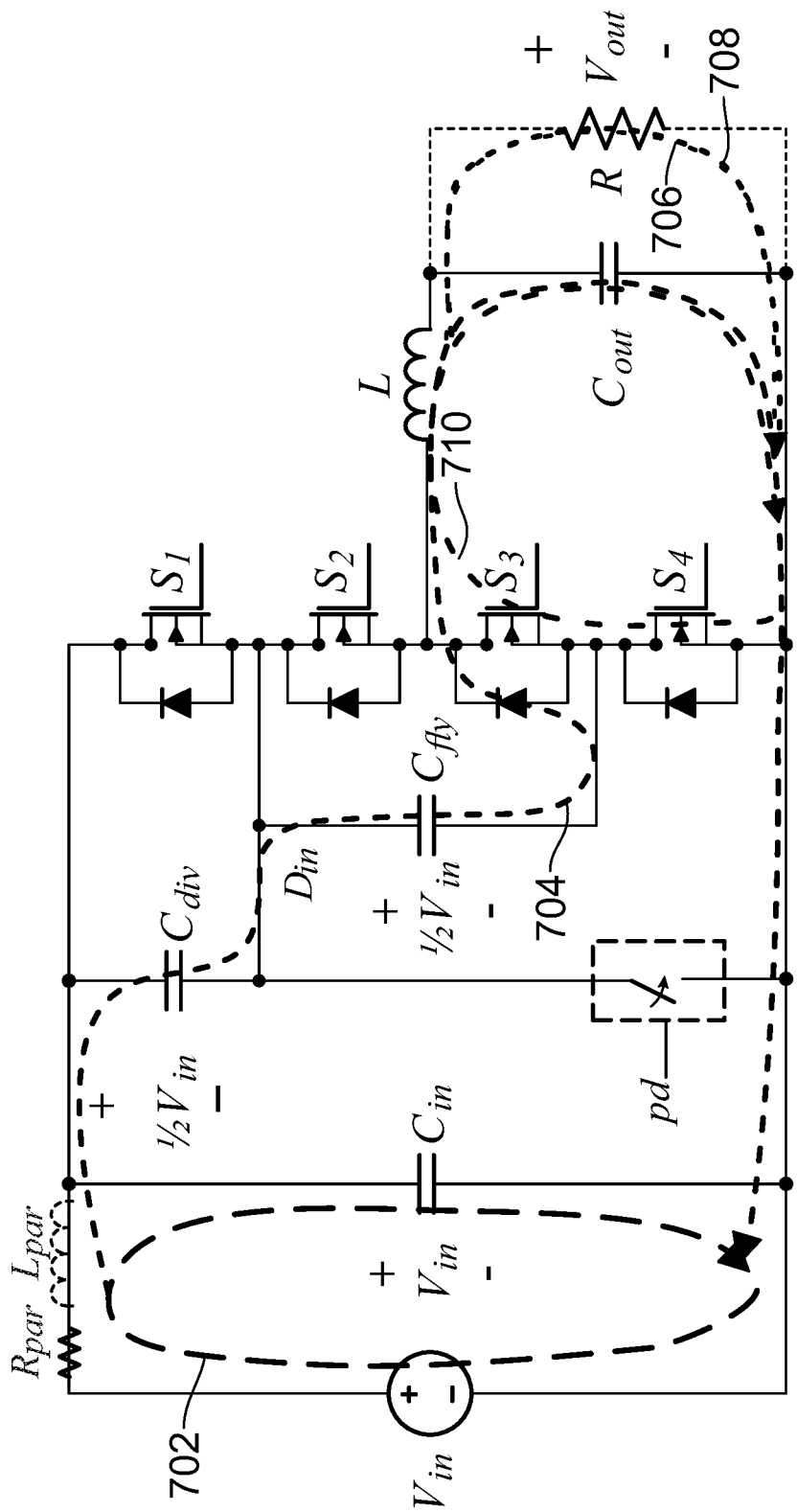
FIG. 7. is a circuit diagram of an example 3L-FC buck with flying capacitor divider start-up method. The initial inrush current path and the inductor discharge path shown in dashed and dotted lines, according to some embodiments.

The second start-up method also features capacitive division using additional passive circuitry but utilizes the flying capacitor itself as a part of the divider. FIG. 3 shows the general commutation cell and FIG. 7 shows implementation for the 3-level buck with the initial inrush current highlighted at 702, 704, and 706 and inductor discharge paths highlighted at 708, and 710.

A start-up capacitor, $C_{div}$, of comparable size to the flying capacitor is connected between the input and the top of the flying capacitor forming a capacitor divider. A high current capacity inrush diode, $D_{in}$, in that path charges the flying capacitor and prevents reverse current flow during steady state operation. A pull-down switch pulls the diode anode to ground sometime after start-up and keeps it reversed biased during normal operation. In this method, the start-up capacitor, flying capacitor, and output capacitor are all in series during power-up.

During steady state operation, the start-up capacitor is connected in parallel with the input capacitor but contributes little to input filtering as the high $R_{on}$ of the small start-up switch makes the total impedance of the start-up capacitor plus switch much higher than that of the input capacitor at all frequencies.

Since the start-up circuit does not interfere with steady state converter operation, this solution is better suited than the input capacitor divider solution to systems where modulation schemes may result in the flying capacitor voltage deviating from $V_{in}/2$, such as the series-capacitor buck operating in $D^2$ mode.

ILL. Implementation and Comparison of Methods

These methods can be extended to other N-level flying capacitor buck converters and reduce the switch voltage stresses during start-up to (N−1) times lower value than that of a conventional buck. For both methods, extension to another 3-level topology, the 2-phase series-capacitor buck, is shown in FIG. 8A and FIG. 8B. Initial inrush current highlighted at 802, 804, 806, and inductor discharge paths highlighted at 808, and 809 for FIG. 8A. For FIG. 8B, initial inrush current highlighted at 810, 812, 818, and inductor discharge paths highlighted at 814, and 816.

Figures 8C, 8D:
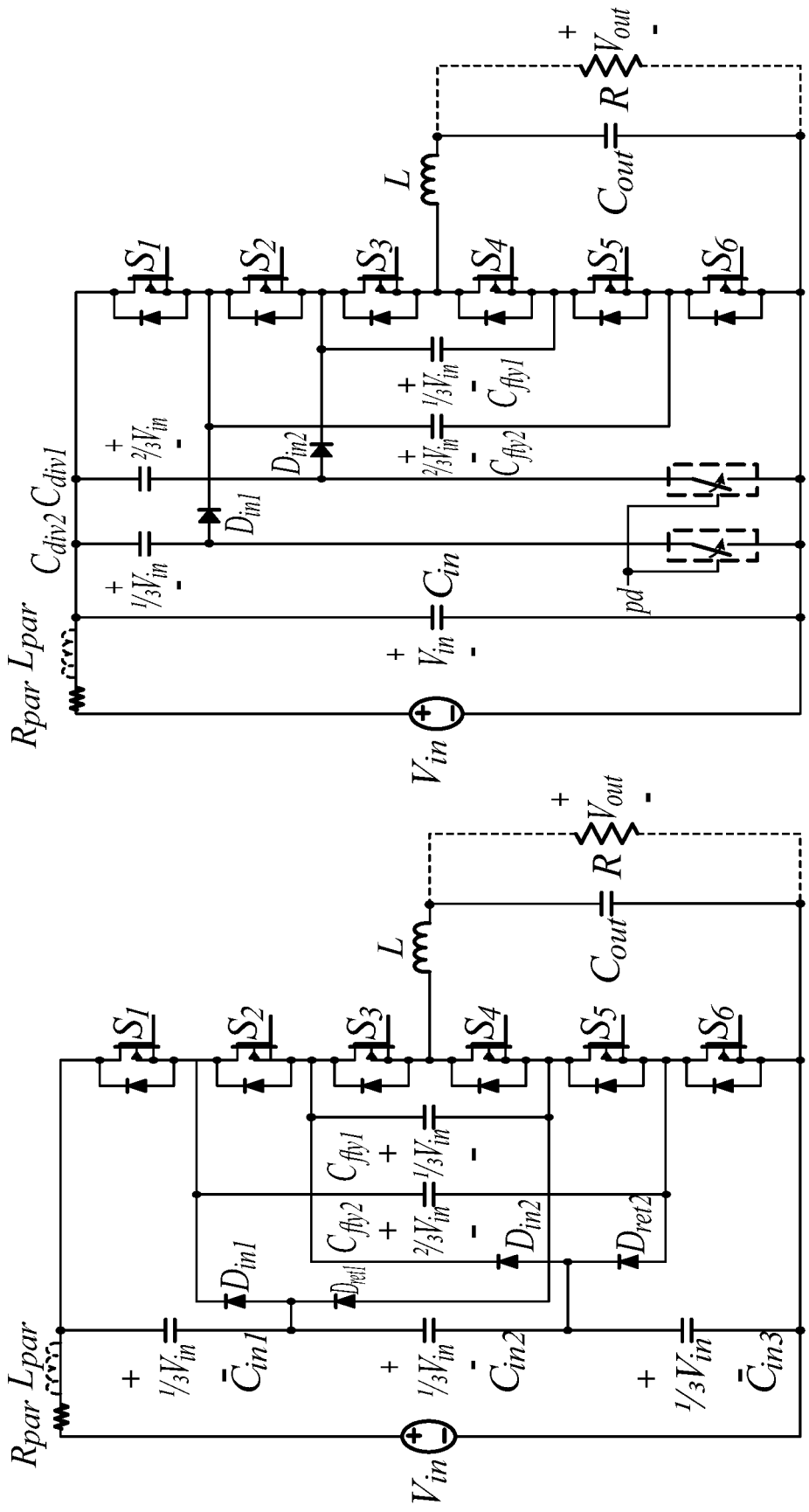
Figure 8F:
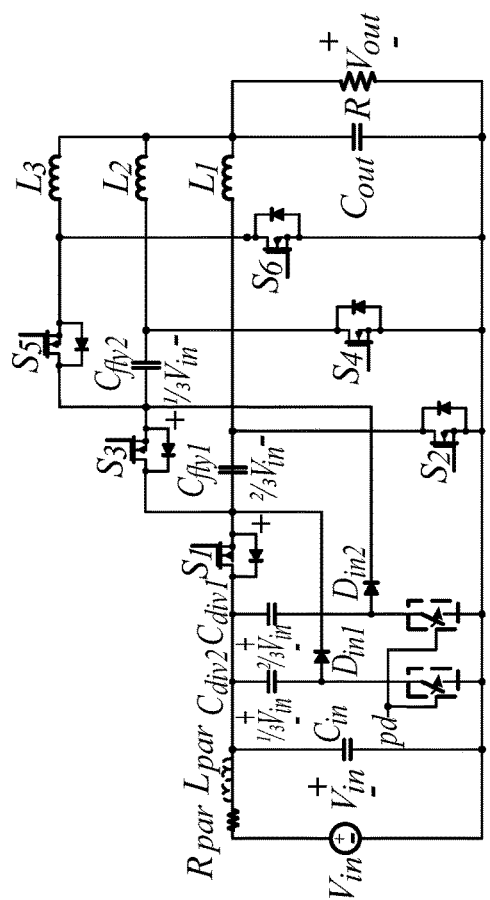
Figure 8E:
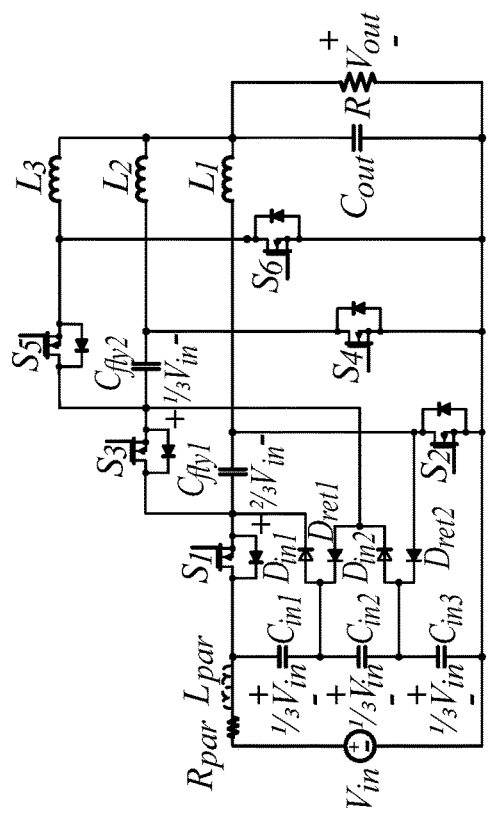
Figure 9A:
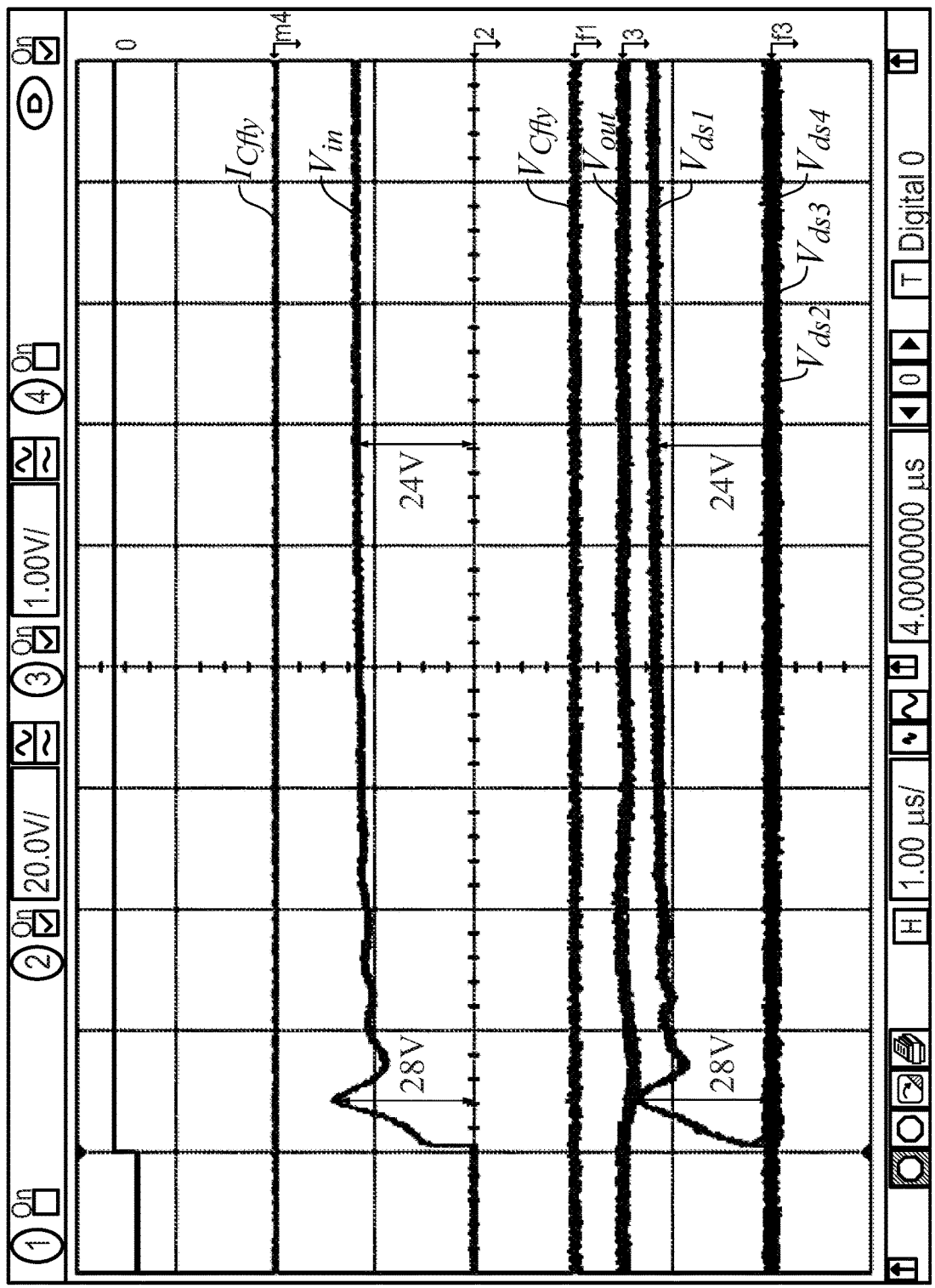
FIG. 9A is a waveform diagram of a fast input voltage ramp (~400 ns) in the 3L-FC buck prototype showing the converter switch voltages on start-up in the absence of any start-up scheme, with the full input voltage seen across $S_1$ ($V_{ds1}=V_{in}$).
Figure 9B:
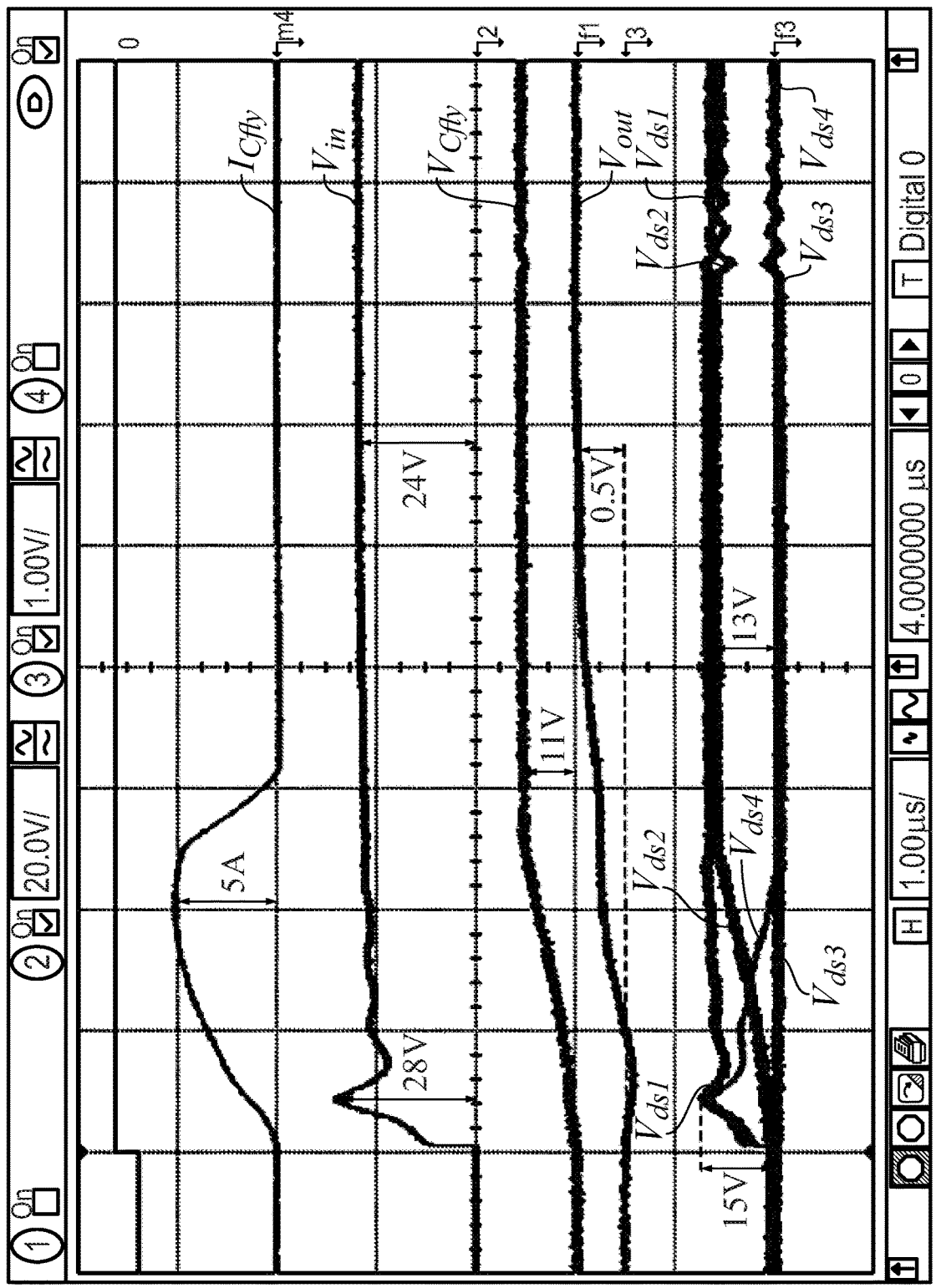
FIG. 9B is a waveform diagram of a fast input voltage ramp (~400 ns) in the 3L-FC buck prototype using the input capacitor divider start-up method. All switch voltages are limited to ~$V_{in}/2$. The flying capacitor is also pre-charged to ~$V_{in}/2$.
Figure 9C:
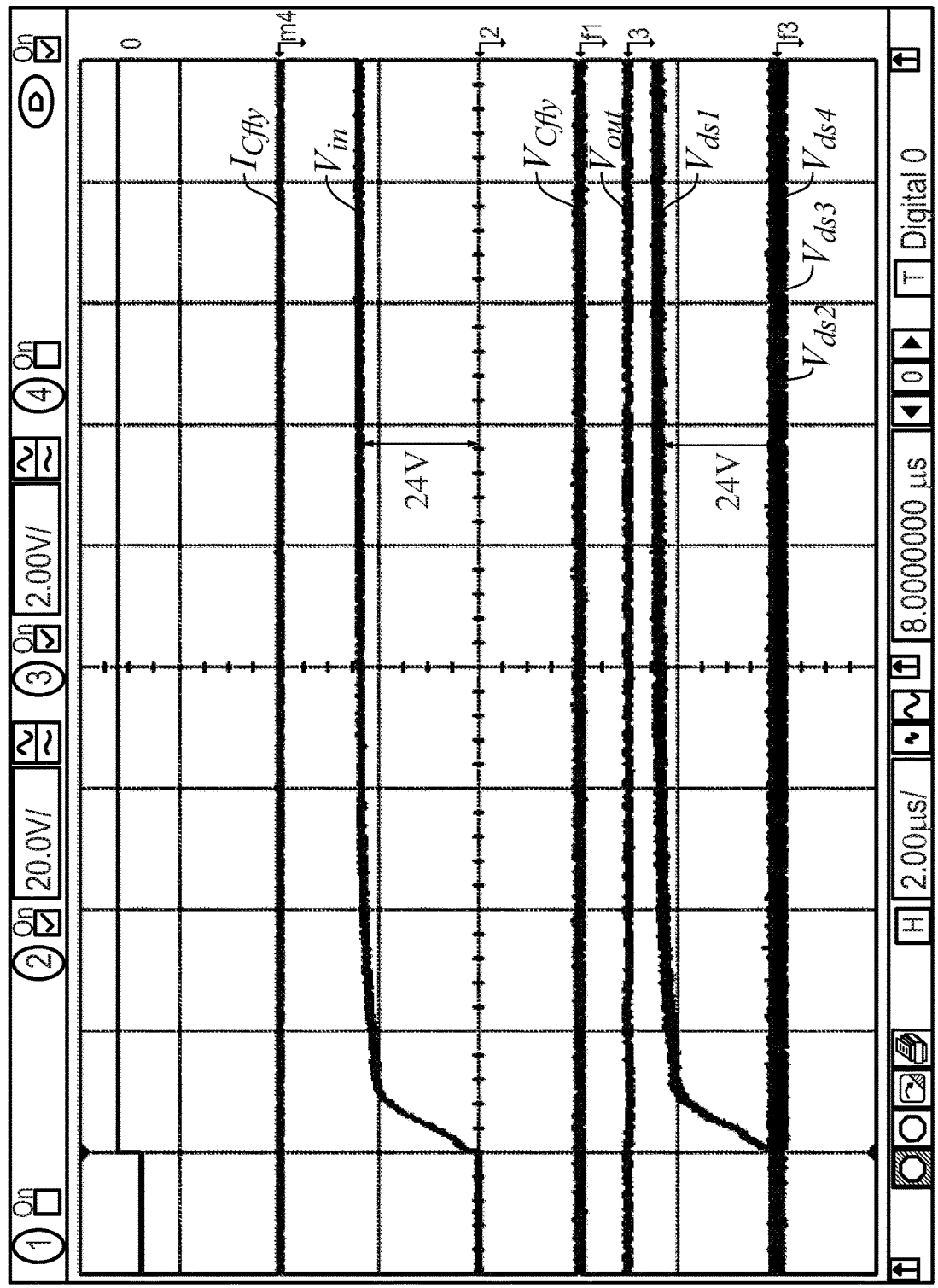
FIG. 9C is a waveform diagram of a fast input voltage ramp (~1 μs) in the 3L-FC buck prototype showing the converter switch voltages on start-up in the absence of any start-up scheme, with the full input voltage seen across $S_1$ ($V_{ds1}=V_{in}$).
Figure 9D:
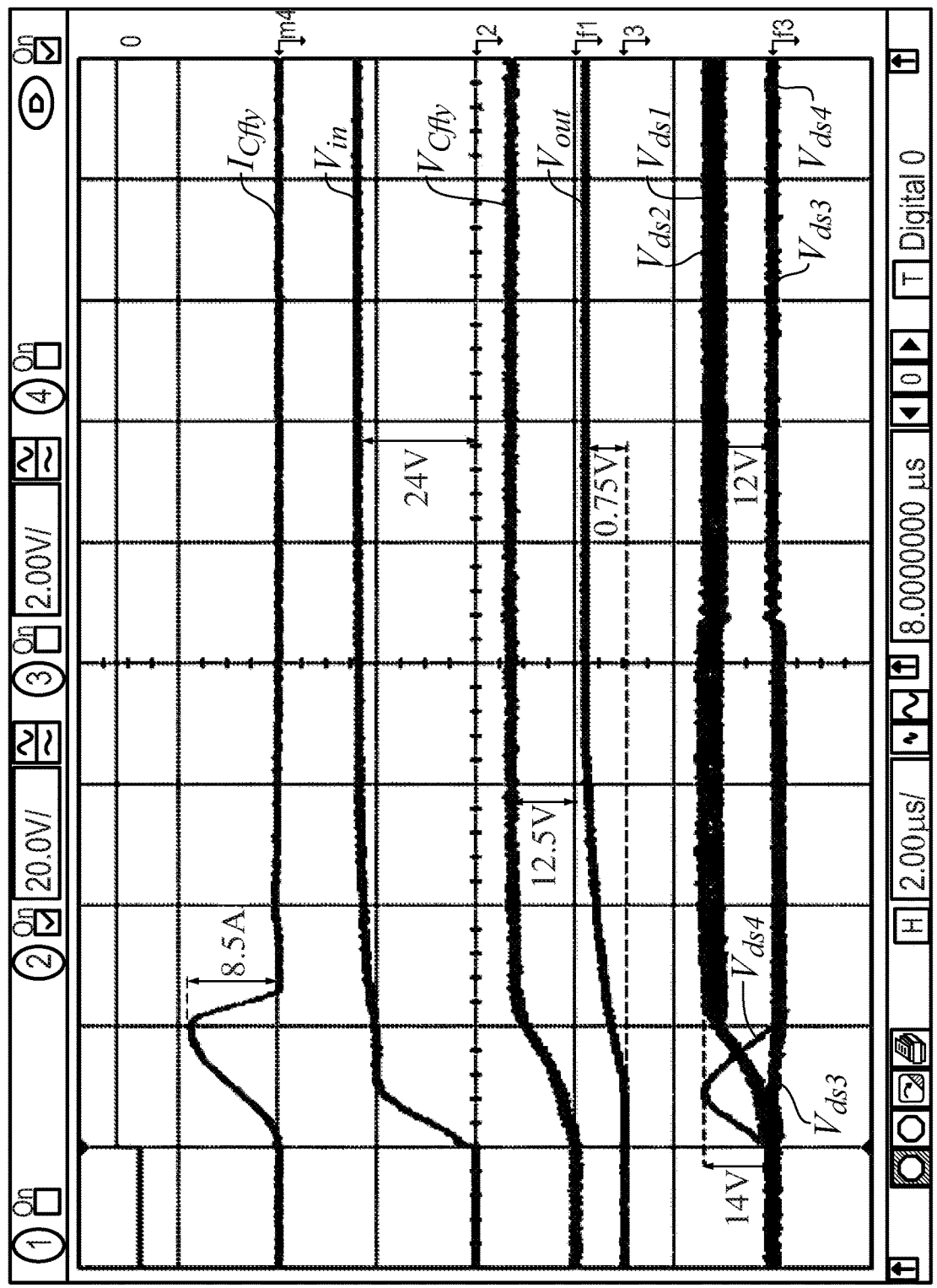
FIG. 9D is a waveform diagram of a fast input voltage ramp (~1 μs) in the 3L-FC buck prototype using the flying capacitor divider start-up method. All switch voltages are limited to ~$V_{in}/2$. The flying capacitor is also pre-charged to ~$V_{in}/2$.

These methods can also be used for start-up in higher order ML-FC topologies such as the 4L-FC buck and the 3-phase series-capacitor buck. These 4-level topologies have two flying capacitors, operating with steady state voltages of $2 \cdot V_{in}/3$ and $V_{in}/3$. For the input capacitor divider method, adding a third stacked input capacitor provides two tap voltages, $2 \cdot V_{in}/3$ and $V_{in}/3$, from which two inrush diodes can be placed to charge the flying capacitors. There is some freedom in the placement of the return diodes, as long as the maximum voltage at the node connected to the return diode anode is exactly equal to the corresponding tap voltage. Implementations of this method with the 4L-FC buck and 3-phase series-capacitor buck are shown in FIG. 8C and FIG. 8E, respectively. Implementation of the flying capacitor divider method with 4-level topologies involves two additional capacitors, each one independently creating a divider with a single flying capacitor. Implementations of this method with the 4L-FC buck and 3-phase series-capacitor buck are shown in FIG. 8D and FIG. 8F, respectively.

IV. Experimental Results

A discrete PCB prototype of the 3L-FC buck converter was made to test the functionality of the start-up methods. The prototype operates at 1 MHz switching frequency and is nominally rated for a conversion ratio of 24V-to-5V, 20 W output. The component values corresponding to FIGS. 4 and 7 are listed in Tables I and II. The methods were tested with fast input voltage rise times of under 1 μs. The results are detailed in FIG. 9A, FIG. 9B, FIG. 9C, and FIG. 9D.

Both start-up methods guarantee that the voltage stress across each switch is limited to $V_{in}/2$ during start-up, and pre-charge the flying capacitor. The peak current, final output voltage and final flying capacitor voltage differ slightly from the approximations primarily due to diode non-idealities. The small ripple in the switch voltages at approximately 8 μs following the input step for both start-up schemes indicates the point at which the body diode of $S_4$ ceases conducting and turns off.

TABLE I

Experimental Prototype Design Specifications

| | |
|---|---|
| $V_{in}$ | 24 V |
| $V_{out}$ | 5 V |
| $P_{out}$ | 20 W |
| $f_{sw}$ | 1 MHz |

TABLE II

Component Parameters for FIG. 4 & FIG. 7

| Parameters | Input Capacitor Divider | Flying Capacitor Divider |
|---|---|---|
| $L_{par}$ | 5 nH | 5 nH |
| $R_{par}$ | 10 mΩ | 80 mΩ |
| $C_{in}$ | — | 5 μF |
| $C_{in1}, C_{in2}$ | 10 μF | — |
| $C_{fly}$ | 1 μF | 1 μF |
| $C_{div}$ | — | 1 μF |
| L | 1.2 μH | 1.2 μH |
| $C_{out}$ | 50 μF | 50 μF |

V. Conclusions

Embodiments described herein introduce two sets of methods for limiting the voltage stress across switches of multi-level flying capacitor (ML-FC) step-down dc-dc converters during start-up. These methods split the input voltage across multiple capacitors and consequently across multiple switches. For a general N-level converter, in applications where the input voltage is expected to rise in a few microseconds or longer, the presented methods ensure (in some cases, guaranteeing) the voltage stress to be (N−1) times lower value than that of a conventional buck during start-up, allowing lower voltage rating transistors with smaller on-resistances to be used. The passive nature of these methods allows their use in applications where the gate drive and logic supply voltages are sourced from the converter input or an internal node. Advantageously, the methods require a limited number of discrete components. The speeds of these methods are limited only by the quality of the matching between high-frequency impedances of the components and can theoretically be pushed to respond to input voltage ramps of fractions of a microsecond. The input capacitor divider method also reduces the stress during input voltage transients. Experimental results demonstrate the functionality of these start-up methods.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

Any and all features of novelty or inventive step described, suggested, referred to, exemplified, or shown herein, including but not limited to processes, systems, devices, and computer-readable and -executable programming and/or other instruction sets suitable for use in implementing such features are claimed.

What is claimed is:

1. A power converter comprising a circuit as part of the power converter, wherein the circuit comprises:
   a commutation cell, the commutation cell including a start-up capacitor and a flying capacitor connected in series;
   a diode, the diode being directly connected between the start-up capacitor and the flying capacitor, and the diode being adapted to prevent reverse current flow during steady state operation;
   a first inductor;
   a second inductor directly connected to the first inductor;
   a first switch connected to an input voltage source of the power converter, the flying capacitor being directly arranged between the first switch and the first inductor;
   a second switch comprising a second switch terminal directly connected to a node between the flying capacitor and the first inductor and another terminal directly connected to a ground;
   a third switch comprising a third switch terminal directly connected to a node between the first switch and the flying capacitor and another terminal directly connected to the second inductor;
   a fourth switch comprising a fourth switch terminal directly connected to a node between the third switch and the second inductor and another terminal directly connected to the ground; and
   a pull-down switch directly connected to a node between the start up capacitor and the diode and is configured to pull a potential of an anode of the diode to the ground after a start-up phase of the power converter, and maintain the diode in a reverse biased state of operation during a state of normal operation.

2. The power converter according to claim 1, wherein the power converter is a multi-level flying capacitor converter.

3. The power converter according to claim 1, wherein the power converter is a N-stage converter, wherein N is one of 3 and 4.

4. The power converter according to claim 1, wherein the start-up capacitor, the flying capacitor, and an output capacitor are connected in series during a power-up state.

* * * * *